United States Patent
Zohar

(10) Patent No.: US 8,359,001 B2
(45) Date of Patent: Jan. 22, 2013

(54) IDENTIFYING THE LOCATION OF MOBILE STATIONS

(75) Inventor: Tsaba Zohar, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/455,068

(22) Filed: Apr. 24, 2012

(65) Prior Publication Data

US 2012/0208517 A1    Aug. 16, 2012

Related U.S. Application Data

(63) Continuation of application No. 12/046,268, filed on Mar. 11, 2008.

(51) Int. Cl.
*H04M 11/04* (2006.01)
*H04W 24/00* (2009.01)

(52) U.S. Cl. .................................. 455/404.2; 455/456.1

(58) Field of Classification Search ............... 455/414.1, 455/418; 445/414.1, 413, 466, 557, 456.1–456.6, 445/404.2; 370/346, 389, 328, 331
See application file for complete search history.

(56) References Cited

U.S. PATENT DOCUMENTS

| 2007/0072620 A1* | 3/2007 | Levitan ..................... 455/456.1 |
| 2008/0207180 A1 | 8/2008 | Peters |
| 2009/0124243 A1* | 5/2009 | Routley et al. ................ 455/418 |

OTHER PUBLICATIONS

Non-Final Office Action for U.S. Appl. No. 12/046,268 Mailed Mar. 8, 2012, 10 Pages.
Non-Final Office Action for U.S. Appl. No. 12/046,268 Mailed Aug. 9, 2011, 10 Pages.
Non-Final Office Action for U.S. Appl. No. 13/455,067 Mailed Jun. 20, 2012, 12 Pages.

* cited by examiner

*Primary Examiner* — Michael Faragalla
(74) *Attorney, Agent, or Firm* — Blakely, Sokoloff, Taylor & Zafman LLP

(57) ABSTRACT

A user of a first mobile station, which is lost either in silent mode or switch-off mode may send a 'Find-Me' message to the first mobile station from a second mobile station. The first mobile station, after receiving the 'Find-Me' message, may power-on the first mobile station enabling the first mobile station to receive voice call and messages. Also, if the first mobile station is in silent mode, the first mobile station may change the profile of the first mobile station from a silent to a regular-noisy mode. The user of first mobile station may call-up the first mobile station and identifies the location of the first mobile station by tracking the ringing sound. The first mobile station may send a location message to the second mobile station in response to receiving the 'Find-Me' message that may be used to identify the location of the first mobile station.

33 Claims, 2 Drawing Sheets

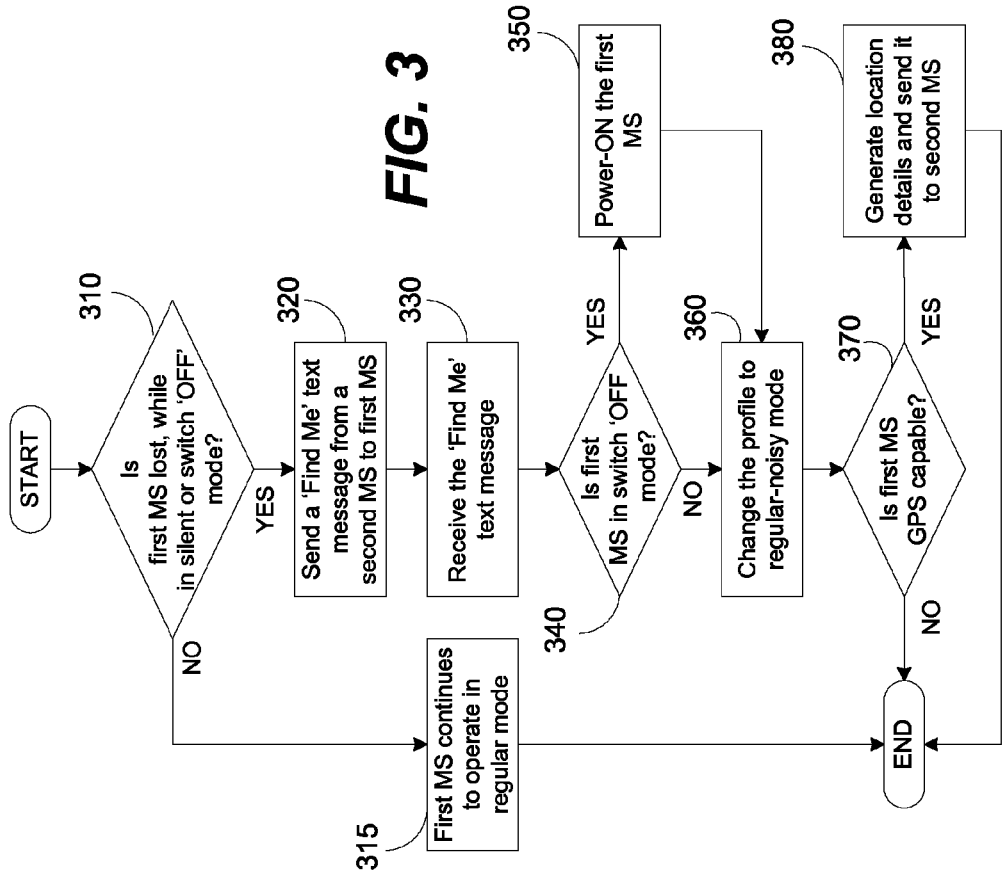
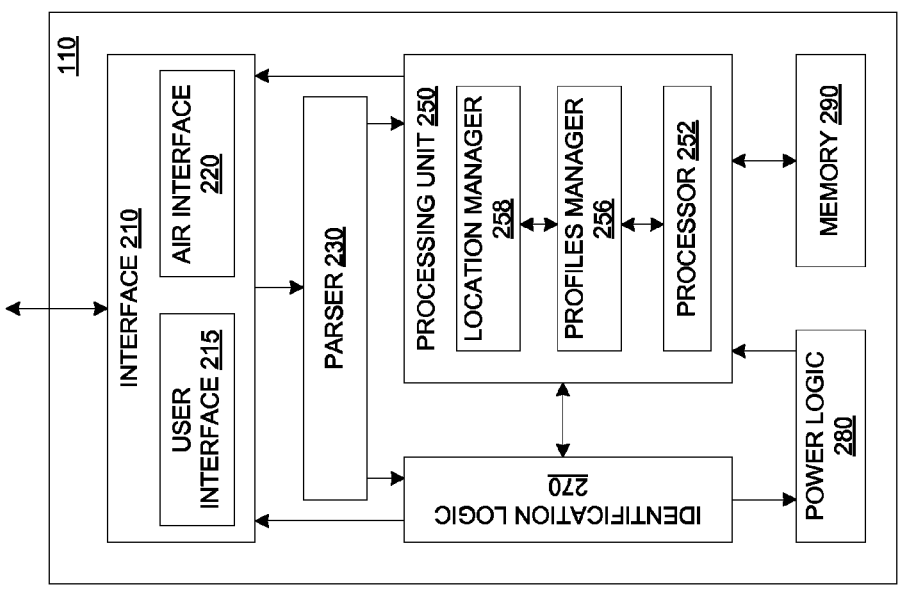

IDENTIFYING THE LOCATION OF MOBILE STATIONS

PRIORITY

This is a continuation of application Ser. No. 12/046,268, filed on Mar. 11, 2008, entitled "Identifying the location of mobile stations" and assigned to the corporate assignee of the present invention and incorporated herein by reference.

BACKGROUND

A mobile network may comprise a plurality of mobile stations (cell phones) used by the users to communicate. For example, a first user may communicate with a second user using voice communication (speech) and text messaging (short message service, SMS) features supported by the cell phones. However, the users may lose their cell phones or forget the location in which the cell phone is placed. For example, the first user may call his/her cell phone and based on the ringing sound generated by the cell phone, the first user may determine the physical location of the cell phone. However, while the cell phone is lost, if the cell phone is 'turned-off mode' or 'silent mode', it may be difficult for the first user to determine the physical location of the cell phone.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2 is a block diagram of a mobile station supporting identification of the location of the mobile station in one embodiment.

FIG. 3 is a flow-chart illustrating the mobile station in which a identifying the location of the mobile station is performed according to one embodiment.

DETAILED DESCRIPTION

Figure 1:
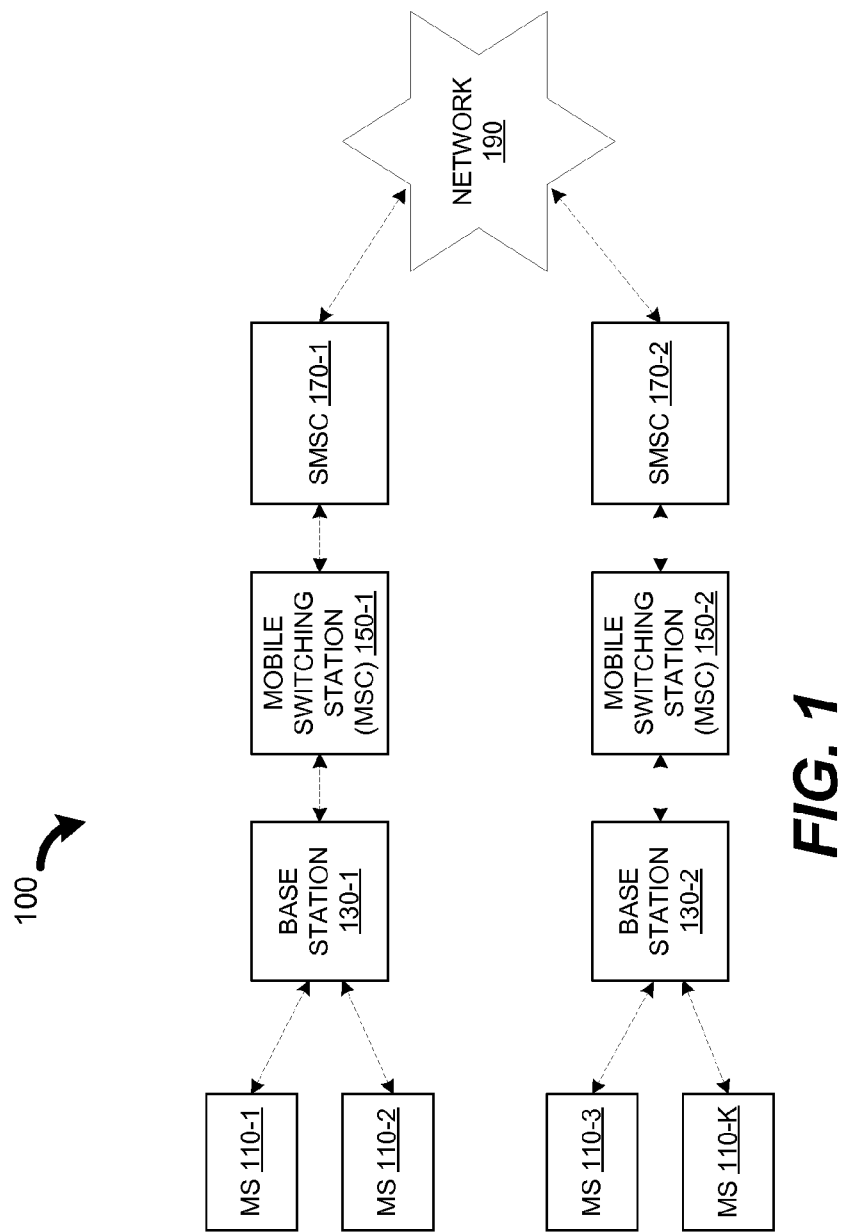
FIG. 1 illustrates a mobile network environment 100, including one or more mobile stations, which support identifying location of the mobile stations according to one embodiment.

The following description describes embodiments of a mobile station whose location can be identified, while it is lost in switched-off or silent mode. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

A mobile network environment 100 including one or more mobile stations, which may support identifying the location of the mobile stations in accordance with one embodiment is illustrated in FIG. 1. In one embodiment, the mobile network 100 may comprise mobile stations (MS) 110-1 to 110-K, base stations 130-1 and 130-2, mobile switching stations (MSC) 150-1 and 150-2, short message service centers (SMSC) 170-1 and 170-2, and a network 190.

In one embodiment, the mobile station (MS) 110-1 to 110-K may support voice and text communication for the users of the mobile stations (MS) 110 to communicate with other users, even while the users are on the move. In one embodiment, the mobile stations (MS) 110 may include cell phones, laptop computers, personal digital assistants (PDAs), mobile internet devices (MIDs), and such other similar devices. In one embodiment, the user of the mobile station MS 110-2 may lose the mobile station MS 110-2, while the mobile station MS 110-2 is in switched off or silent mode.

In one embodiment, the user may send a text message such as a 'Find-Me' message to the mobile station MS 110-2 using other mobile station MS 110-K. In one embodiment, if the mobile station MS 110-2 is in switched-off mode, the MS 110-2, in response to receiving the 'Find-Me' message, may power-on the components of the MS 110-2 such that the mobile station MS 110-2 may receive voice call and text messages. In one embodiment, the user of mobile station MS 110-2 may call-up the MS 110-2 using the mobile station MS 110-K. In one embodiment, the user of the MS 110-2 may call-up the MS 110-2 after sending the 'Find-Me' message from the mobile station MS 110-K. In one embodiment, the user of MS 110-2 may identify the location of the MS 110-2 by tracking the ringing sound of the mobile station MS 110-2.

In one embodiment, if the mobile station MS 110-2 is in silent mode, the mobile station MS 110-2 may change the profile of the mobile station MS 110-2 from a silent mode to a regular-noisy mode. In one embodiment, the user may call the MS 110-2 after sending the 'Find-Me' message from the mobile station MS 110-K and identify the location of the MS 110-2 by tracking the ringing sound of the MS 110-2. In yet other embodiment, the MS 110-2 may send a location message to the mobile station MS 110-K in response to receiving the 'Find-Me' message. In one embodiment, the location message sent by the mobile station MS 110-2 may include the coordinate values, which may be used to identify the location of the mobile station MS 110-2.

In one embodiment, the base station BS 130-1 may receive the voice and message data from the mobile stations MS 110 (e.g., 110-K) and may send the data packets to the mobile switching center MSC 150-1. In one embodiment, the base station 130-1 may also transmit packets to the MS 110 (e.g., MS 110-2) that are received from the mobile stations such as MS 110-K. In one embodiment, the base stations 130 may comprise transceivers for transmitting and receiving the data units. In one embodiment, the base stations 130 may support standards such as global system for mobile (GSM), general packet radio system (GPRS).

In one embodiment, the mobile switching center (MSC) 150 may handle voice calls, text messages (SMS message), and other data services such as conference calls and circuit switched data. In one embodiment, the MSC 150 may perform set-up and release end-to-end connection, handle mobility, hand-off requirements, and billing services. In one embodiment, the MSC 150-2 may receive the 'Find-Me' message from the base station 130-2 and may forward the 'Find-Me' message to the SMSC 170-2.

In one embodiment, the short message servicing center (SMSC) 170 (e.g., SMSC 170-2) may receive a text message such as the 'Find-Me' message from one mobile station 110 (e.g., MS 110-K) and may forward the text message to other mobile station 110 (e.g., MS 110-2) via the network 190. In one embodiment, the SMSC 170 may store the incoming message and deliver the incoming message on to a destination mobile station while the destination mobile station is available. In one embodiment, the SMSC 170 may attempt a known number of times to deliver the message to the destination mobile station. In one embodiment, the SMSC 170 may include store-and-forward operation.

In one embodiment, the network 190 may comprise switches, routers, bridges, and such other similar devices to route the voice and data units from the sender to the receiver. In one embodiment, the network 190 may support wireless technologies such as IEEE® 802.11a, IEEE® 802.11g, WiMax, and such other similar wireless technologies. In one embodiment, the network 190 may receive the 'Find-Me' message forwarded by the SMSC 170-2 and may route the 'Find-Me' message to the SMSC 170-1.

FIG. 2 illustrates a block diagram of a mobile station supporting identification of the location of the mobile station in one embodiment. In one embodiment, the mobile station MS 110-2 may comprise an interface 210, a parser 230, a processing unit 250, an identification logic 270, a power logic 280, and a memory 290.

In one embodiment, the interface 210 may comprise a user interface 215 and an air interface 220. In one embodiment, the user interface 215 may comprise a key pad, microphone, camera, and such other similar devices, which may allow the user to send voice call and text messages. In one embodiment, user may use the key pad to key-in the message or call-up a number, which identifies the other mobile station 110.

In one embodiment, the air interface 220 may be used to send and receive voice calls and messages between the mobile stations MS 110 over the air interface. In one embodiment, the air interface 220 may comprise antennas, signal conditioning, and such other units to support transfer of messages and voice calls between the mobile stations MS 110. In one embodiment, the air interface 220 may receive the 'Find-Me' message and forward the 'Find-Me' message to the parser 230. In response to forwarding the Find-me message, the air interface 220 may receive a 'location message' from the processing unit 250 and may forward the 'location message' over the air medium that may reach the mobile station from which the 'Find-Me' message was received.

In one embodiment, the parser 230 may check if a message received is a 'Find-Me' message and may forward the "Find-Me' message to the identification logic 270. In one embodiment, the parser 230 may forward the message to the processing unit 250 if the message is not a 'Find-Me' message. In one embodiment, the parser 230 may parse the message to check the presence of the string "Find-Me".

In one embodiment, the processing unit 250 may comprise a processor 252, a profiles manager 256, and a location manager 258. In one embodiment, the processor 252 may power-ON in response to receiving a 'power signal' from the power logic 280. In one embodiment, the processor 252 may configure the profiles manager 256 in response to receiving a 'change profile' signal from the identification logic 280. In one embodiment, the processor 252 may change the ring tone from silent, or meeting, or vibration mode to a regular-noisy mode.

In one embodiment, the user of the mobile station 110-2 may have created one or more profiles and the processor 252 may instruct the profiles manager 256 by sending a 'select regular profile' signal. In one embodiment, the profiles manager 256 may deselect the 'silent', or 'meetings' profile and select a 'regular-noisy' profile in response to receiving the 'select regular profile' signal. In one embodiment, the ringing tone of the regular-noisy profile may be set equal to a noisy mode by the user before the mobile station MS 110-2 is lost. In one embodiment, the profiles, messages, and other software programs may be stored in the memory 290.

In one embodiment, the processor 252 may receive coordinate values from which the location of the mobile station 110-2. In one embodiment, the processor 252 may receive the coordinate values in response to sending a location retrieve signal to the location manager 258. In one embodiment, the processor 252 may generate the location message and send the location message to the interface 210. In one embodiment, the location manager 258 may be enabled with global positioning system (GPS) and the location manager 258 generate the coordinate values based on the data provided by the GPS system.

In one embodiment, the identification logic 270 may send a 'power-on' signal to the power logic 280 in response to receiving the 'Find-Me' message from the parser 230. In one embodiment, the identification logic 270 may wait until the processing unit 250 is powered ON and may then send the 'change profile' signal to the processing unit 250. In one embodiment, the identification logic 270 may wake-up from the sleep mode in response to receiving the "Find-Me" message and be in sleep-mode otherwise. Such an approach may conserve power.

In one embodiment, the power logic 280 may generate the 'power signal' in response to receiving the 'power-on' signal from the identification logic 270. In one embodiment, the power logic 280 may send the 'power signal' to the processing unit 250, which may switch on the power to the processing unit 250.

FIG. 3 is a flow-chart illustrating the mobile station in which a identifying the location of the mobile station is performed according to one embodiment. In block 310, the user of the first mobile station may determine if the first mobile station is lost while the MS 110-2 was in switch-OFF or silent mode. Control passes to block 315 if the first mobile station is not lost and to block 320 if the first mobile station is lost while the MS 110-2 was in switch-OFF or silent mode. In one embodiment, the user of the mobile station MS 110-2 may determine if the MS 110-2 is lost while the MS 110-2 was in switch-OFF or silent mode.

In block 315, the first mobile station MS 110-2 continues to operate in regular mode. In block 320, the user may use a second mobile station MS 110-K to send a "Find-Me" message to the first mobile station MS 110-2.

In block 330, the first mobile station MS 110-2 may receive the "Find-Me" message. In one embodiment, the air interface 220 may receive the "Find-Me" message and send the "Find-Me" message to the parser 230, which in turn would parse the message and send the "Find-Me" message to the identification unit 270 on detecting the presence of the string "Find-Me" in the "Find-Me" message.

In block 340, the identification logic 270 of the first mobile station MS 110-2 may determine if the mobile station MS 110-2 is in switched-OFF mode and control passes to block 350 if the identification logic 270 detects that the first mobile station MS 110-2 is in switched OFF mode and to block 360 if the first mobile station MS 110-2 is not in switch-OFF mode.

In block 350, the identification logic 270 of the first mobile station MS 110-2 may initiate the power logic 280 to power on the processing unit 250. In one embodiment, the identification logic 270 may send the 'power-on' signal to the power logic 280. The power logic 280 may power-on the processing unit 250 in response to receiving the 'power signal' from the identification logic 270.

In block 360, the profiles manager 256 may change the profile of the first mobile station MS 110-2 from the silent or meeting mode to the regular noisy mode in response to receiving the 'select regular profile' signal from the processor 252. In one embodiment, the processor 252 may generate the 'select regular profile' signal in response to receiving the 'change profile' signal from the identification logic 270.

In block 370, the location manager 258 may check if the first mobile station MS 110-2 is GPS enabled and control passes to block 380 if the first mobile station MS 110-2 is GPS enabled and the process ends otherwise.

In block 380, the processor 252 may retrieve the location details from the location manager 258 and may generate the location message comprising the location details. In one embodiment, the processor 252 may send the location message to the second mobile station MS 110-K.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a first mobile device comprises enabling the first mobile device to ring after changing the first mobile device from a silent mode to a regular mode in response to receiving a message from a second mobile device, wherein enabling the first mobile device further includes,
receiving the message in the first mobile device,
parsing the message to determine whether the message includes a pre-defined string,
determining whether the first mobile device is in a switched-off mode,
powering on the first mobile device if it is determined that the first mobile device is in the switched-off mode in response to receiving the message including the pre-defined string,
changing the first mobile device from the silent mode to the regular mode after powering on the first mobile device or changing the first mobile device from the silent mode to the regular mode without powering on the first mobile device if it is determined that the first mobile device is not in the switched-off mode,
identifying the location of the first mobile device by tracking the ringing sound generated by the first mobile device in response to a call made from the second mobile device,
forwarding the message to an identification logic if the message includes the pre-defined string,
determining whether the identification logic is in a sleep-mode,
waking-up the identification logic in response to receiving the message if the identification logic is in the sleep-mode,
generating a power-on signal in the identification logic after waking-up the identification logic, and
sending the power-on signal to a power logic to enable the power-logic to power-on a processing logic.

2. The method of claim 1 comprises generating a power signal, in the power logic, in response to receiving the power-on signal.

3. The method of claim 2 comprises powering-on the processing logic in response to generating the power signal.

4. The method of claim 1 comprises,
waiting until the processing unit is powered on after issuing the power-on signal; and
generating a 'change profile' signal to cause the first mobile device to change the profile of the first mobile device from the silent mode to the regular mode.

5. The method of claim 1, wherein the message sent by the second mobile device is a text message.

6. The method of claim 5, wherein the text message includes a "Find Me" string.

7. The method of claim 1 comprises changing the first mobile device from a meeting mode to the regular mode in response to receiving the message from the second mobile device.

8. The method of claim 1 comprises changing the first mobile device from a vibration mode to the regular mode in response to receiving the message from the second mobile device.

9. A cell phone, comprising:
a user interface, wherein the user interface is to receive a message from a mobile device,
a parser coupled to the user interface, wherein the parser to receive the message and determine whether the message includes a pre-defined string, wherein the parser to forward the message to an identification logic if the message includes the pre-defined string
the identification logic coupled to the parser, wherein the identification logic to determine whether at least portions of the cell phone are in a switched-off mode in response to receiving the message, wherein the identification logic to wake-up in response to receiving the message and generate a power-on signal after waking up, a power logic coupled to the identification logic, wherein the power logic to generate a power signal to power on the cell phone if it is determined that the cell phone is in the switched-off mode, a processing unit coupled to the parser, the identification logic, and the power logic and a memory, wherein the processing unit to, change the cell phone from the silent mode to the regular mode after powering on the cell phone if it is determined that the cell phone is in the switched-off mode, or change the cell phone from the silent mode to the regular mode without powering on the cell phone if it is determined that the cell phone is not in the switched-off mode, a user to identify the location of the cell phone by tracking the ringing sound generated by the cell phone in response to a call made from the mobile device.

10. The cell phone of claim 9 wherein the identification logic to send the power-on signal to a power logic in response to receiving the message.

11. The cell phone of claim 10, wherein the power logic to generate a power signal to power on the processing unit of the c in response to receiving the power-on signal.

12. The cell phone of 11 the processing unit further comprises a processor, wherein the processor to power on in response to receiving the power signal.

13. The cell phone of claim 9 wherein the identification logic to, wait until the processing unit is powered on after issuing the power-on signal; and generate a 'change profile' signal to cause the first mobile device to change the profile of the first mobile device from the silent mode to the regular mode.

14. The cell phone of claim 13, wherein the processor to send a 'select regular profile' signal in response to receiving the 'change profile' signal.

15. The cell phone of claim 14 the processing unit further comprises a profiles manager, wherein the profiles manager to deselect the silent mode and select the regular mode in response to receiving the 'select regular profile' signal.

16. The cell phone of claim 9, wherein the message received is a text message.

17. The cell phone of claim 16, wherein the text message includes a "Find Me" string.

18. The cell phone of claim 9, wherein the profiles manager to deselect a meeting mode and select the regular mode in response to receiving the 'select regular profile' signal if the cell phone was in the meeting mode.

19. The cell phone of claim 9, wherein the profiles manager to deselect a vibration mode and select the regular mode in response to receiving the 'select regular profile' signal if the cell phone was in the vibration mode.

20. A system comprising:

a plurality of mobile devices comprising a first mobile device and a second mobile device, a plurality of network devices, and a network including one or more switches, routers, and bridges, wherein a first network device to examine the message received from the second mobile device before forwarding the message to a second network device, wherein the second network device to set-up a connection with a third network device after determining that the message includes a pre-defined string, wherein the third network device to interface with the network before sending the message to the network, wherein the network to forward the message to first mobile device, wherein the first mobile device to, receive the message, determine whether the message includes a pre-defined string, determine whether at least portions of the first mobile device are in a switched-off mode in response to receiving the message, power-on the portions of the first mobile device, which were switched-off prior to receiving the message, and change the first mobile device from the silent mode to the regular mode after powering on the first mobile device if it is determined that the first mobile device is in the switched-off mode, or change the first mobile device from the silent mode to the regular mode without powering on the first mobile device if it is determined that the first mobile device is not in the switched-off mode prior to receiving the message, change the profile of the first mobile device from a meeting mode to the regular mode after powering on the first mobile device if it is determined that the first mobile device is in the switched-off mode, or change the first mobile device from the meeting mode to the regular mode without powering on the first mobile device if it is determined that the first mobile device is not in the switched-off mode prior to receiving the message.

21. The system of claim 20, wherein the first mobile device to change the profile of the first mobile device from a vibration mode to the regular mode after powering on the first mobile device if it is determined that the first mobile device is in the switched-off mode, or change the first mobile device from the vibration mode to the regular mode without powering on the first mobile device if it is determined that the first mobile device is not in the switched-off mode prior to receiving the message.

22. The system of claim 20, wherein a user to identify the location of the first mobile device by tracking the ringing sound generated by the first mobile device in response to a call made from the second mobile device.

23. The system of claim 20, wherein the first network device to support global system for mobile (GSM) standards.

24. The system of claim 20, wherein the first network device to support general packet radio system (GPRS) standard.

25. The system of claim 20, wherein the first network device is a base station.

26. The system of claim 20, wherein the second network device to set-up and release end-to-end connections.

27. The system of claim 23, wherein the second network device is a mobile switching center.

28. The system of claim 20, wherein the third network device may perform store-and-forward operation while delivering the message to the first mobile device.

29. The system of claim 28, wherein the third network device to store the message and attempt to have the message delivered to the first mobile device one or more times.

30. The system of claim 25, wherein the third network device is a sort message serving center.

31. The system of claim 20, wherein the switches, routers, and bridges support one or more wireless technologies.

32. The system of claim 20, wherein the message received and forwarded by the first, second, and the third network devices includes a text message.

33. The system of claim 20, wherein the text message includes a "Find Me" text message.

* * * * *